(12) United States Patent
Ge et al.

(10) Patent No.: US 8,413,511 B2
(45) Date of Patent: Apr. 9, 2013

(54) ACCELEROMETER

(75) Inventors: Zhou Ge, Shenzhen (CN); Bin Yang, Shenzhen (CN); Zheng-Kui Meng, Shenzhen (CN); Yi-Lin Yan, Shenzhen (CN); Rui Zhang, Shenzhen (CN)

(73) Assignees: AAC Acoustic Technologies (Shenzhen) Co., Ltd., Shenzhen (CN); American Audio Components Inc., La Verne, CA (US)

( * ) Notice: Subject to any disclaimer, the term of this patent is extended or adjusted under 35 U.S.C. 154(b) by 328 days.

(21) Appl. No.: 13/015,987

(22) Filed: Jan. 28, 2011

(65) Prior Publication Data
US 2011/0296916 A1    Dec. 8, 2011

(30) Foreign Application Priority Data
Jun. 7, 2010  (CN) .......................... 2010 1 0193758

(51) Int. Cl.
*G01P 15/125*  (2006.01)
(52) U.S. Cl. ..................................... 73/514.32; 73/510
(58) Field of Classification Search ............... 73/514.32, 73/510
See application file for complete search history.

(56) References Cited

U.S. PATENT DOCUMENTS

| | | | |
|---|---|---|---|
| 7,258,012 B2 * | 8/2007 | Xie ............................. | 73/514.32 |
| 7,784,344 B2 * | 8/2010 | Pavelescu et al. .......... | 73/514.32 |
| 7,793,544 B2 * | 9/2010 | Merassi et al. ............. | 73/514.32 |

* cited by examiner

*Primary Examiner* — John Chapman, Jr.
(74) *Attorney, Agent, or Firm* — IPro, Inc.; Na Xu

(57) ABSTRACT

A accelerometer includes a substrate define a stationary electrode thereon, a first moveable mass defining a conductive-layer thereon facing the stationary electrode, a plurality of first elastic elements coupled with a peripheral side of the first moveable mass, a first fixed element surrounding the first moveable mass and fixedly attached to the substrate, a plurality of first fixed electrodes extending outwardly from the first fixed element, a second moveable mass surrounding the first fixed electrodes, a plurality of first moveable electrodes extending inwardly from the second moveable mass toward the first fixed element and parallel to the first fixed electrodes, respectively, a plurality of second elastic elements coupled with a peripheral side of the second moveable mass, and a second fixed element surrounding the second moveable mass and fixedly attached to the substrate.

4 Claims, 3 Drawing Sheets

ACCELEROMETER

FIELD OF THE INVENTION

The present invention generally relates to the art of mirco-electromechanical system accelerometer, and more particularly, to a three-axis capacitive accelerometer.

RELATED ART OF THE INVENTION

MEMS (Micro-Electro-Mechanical System) accelerometers have been widely used in automobile application, such as electronic stability control (ESC), adaptive cruise control (ACC), airbag systems and collision detection. The MEMS accelerometers even find more applications in consumer electronics, for instance, the cell phone, PDA, digital still camera (DSC), and video games.

Generally, a three-axis accelerometer related present invention includes several separate models for forming several respective capacitors in directions of X-axis, Y-axis, and Z-axis. So, a size of the three-axis accelerometer can not become much smaller. And a sensitiveness of the three-axis accelerometer in Z-axis has a lower level.

Therefore, an improved accelerometer that can resolve the problems mentioned-above is desired.

DETAILED DESCRIPTION OF THE EXEMPLARY EMBODIMENT

Reference will now be made to describe one exemplary embodiment of the present invention in detail.

Figure 1:
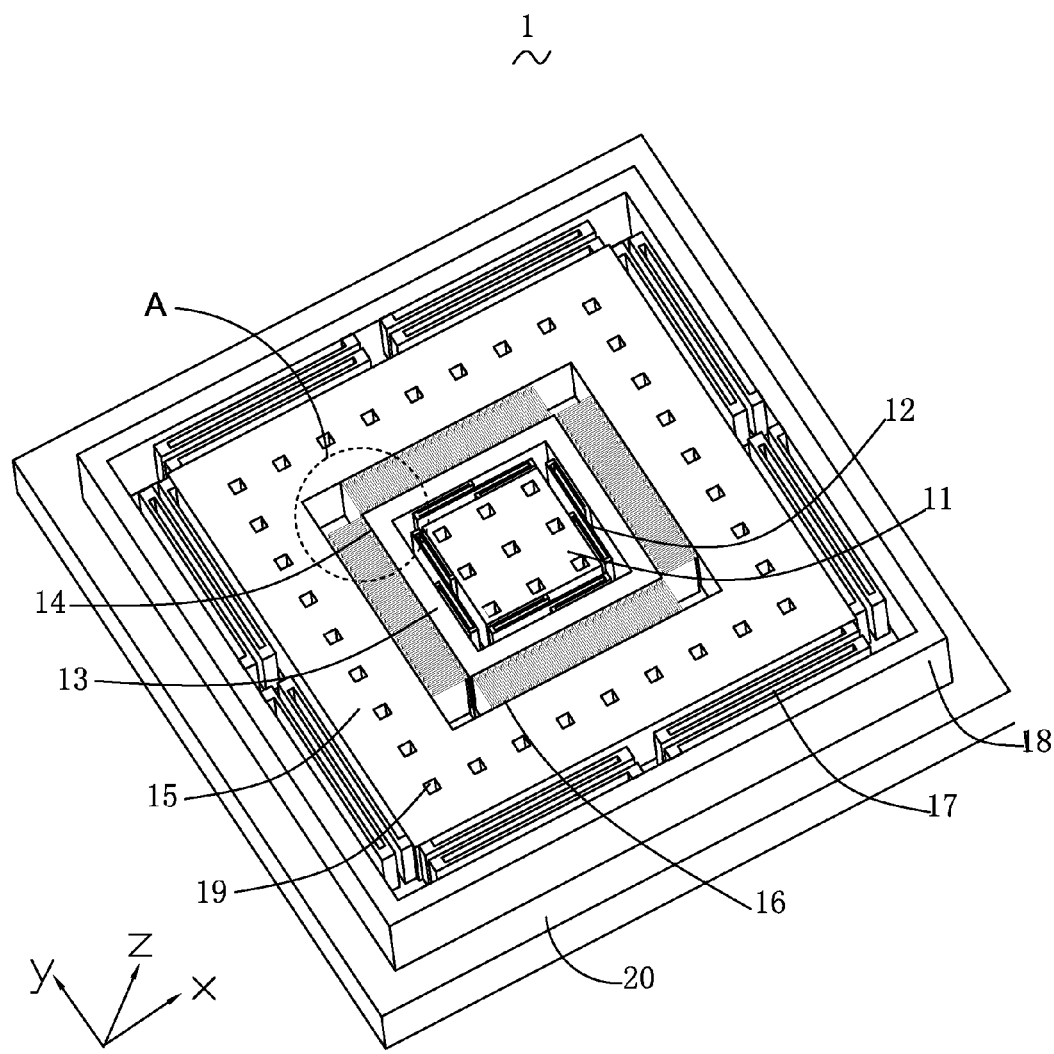
FIG. 1 depicts an isometric view of an accelerometer in accordance with one exemplary embodiment of the present invention.
Figure 2:
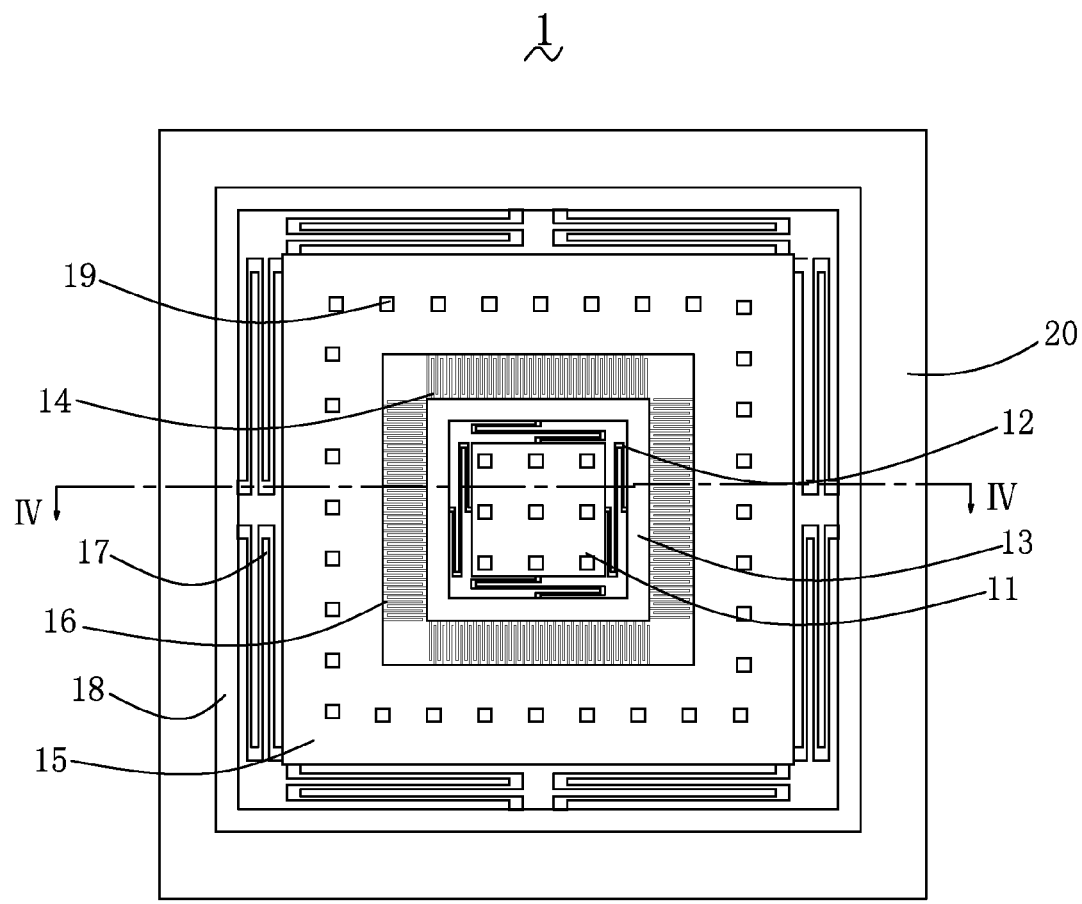
FIG. 2 depicts a top view of the accelerometer in FIG. 1.

Referring to FIGS. 1-2, an accelerometer 1, in accordance with one exemplary embodiment of the present invention, from a center of the accelerometer toward an edge of the accelerometer, includes a first moveable mass 11, two pairs of first elastic elements 12 coupled with the first moveable mass 11 for supporting the first moveable mass 11, a first fixed element 13 surrounding the first moveable mass 11 and coupled with the first elastic elements 12, a plurality of first fixed electrodes 14 extending outwardly from the first fixed element 13, a second moveable mass 15 surrounding the first fixed electrodes 14, a plurality of first moveable electrodes 16 extending from the second moveable mass 15 toward the first fixed element 13, a plurality of second elastic elements 17 coupled with the second moveable mass 15 for supporting the second moveable mass 15, and a second fixed element 18 surrounding the second moveable mass 15 and coupled with the second elastic elements 17.

Each of the first fixed element 13, the second moveable mass 15, and the second fixed element 18 defines a central hole, so that the first fixed element 13 surrounds the first moveable 11, the second moveable mass 15 surrounds the fixed element 13, and the second fixed element 18 surrounds the moveable mass 15. Outlines of the first moveable mass 11, the first fixed element 13, the second moveable mass 15 and the second fixed element 18 are preferably configured as squares.

Figure 3:
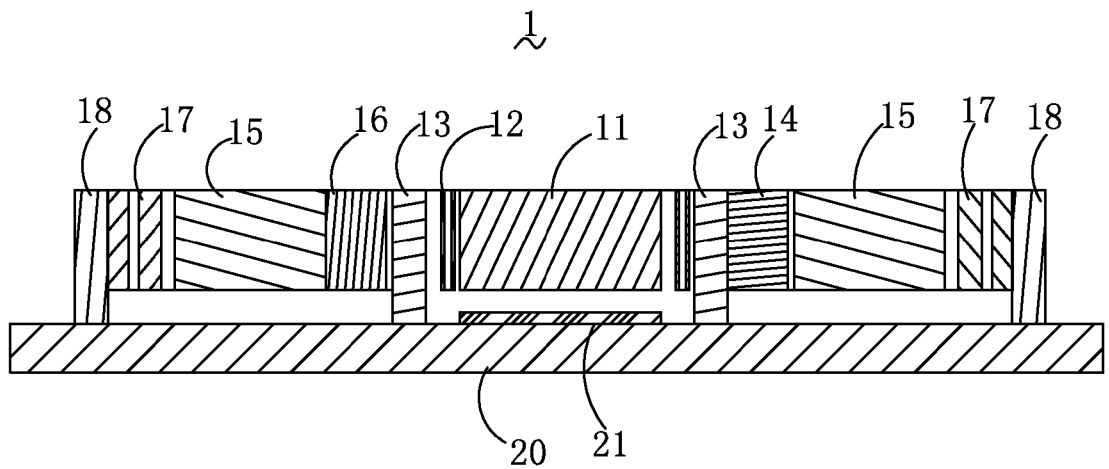
FIG. 3 depicts a cross-sectional view of the accelerometer taken along IV-IV in FIG. 2.

Referring to FIG. 3, together with FIGS. 1-2, the accelerometer 1 furthermore includes a substrate 20, a second fixed electrode 21 defined on the substrate 20 and facing the first moveable mass 11. And, a surface facing the second fixed electrode 21 of the first moveable mass 11 is parallel to the second fixed electrode 21, and a conductive-layer is provided on the surface facing the second fixed electrode 21 of the first moveable mass 11.

The first fixed element 13 and the second fixed element 18 are fixed to the substrate 20. And, the first moveable mass 11 and the second moveable mass 15 are suspended above the substrate by the first elastic elements 12 and the second elastic elements 17 respectively.

Eight second elastic elements 17 are respectively fixedly connected to four inner sides of the second fixed element 18, and four outer sides of the second moveable mass 15, with each two second elastic elements 17 between each two opposite sides of the second fixed element 18 and the second moveable mass 15, for supporting the second moveable mass 15 and allowing limited movement of the second moveable mass 15 in directions of two orthogonal axes (X and Y) in the plane parallel to both of the substrate 20 and the second moveable mass 15.

Four first elastic elements 12 are respectively fixedly connected to four inner sides of the first fixed element 13, and four outer sides of the first moveable mass 11, with each one first elastic element 12 between two opposite sides of the first fixed element 13 and the first moveable mass 11, for supporting the first moveable mass 11 and allowing limited movement of the first moveable mass 11 in a directions of an axis (Z) upright to the two axes (X and Y).

The first elastic elements 12 and the second elastic element 17 are configured as serpentine arms.

A plurality of holes 19 are defined on the first moveable mass 11 and the second moveable mass 15 for being considered as dampers.

The first moveable mass 11 is made of monocrystalline silicon, and the conductive-layer is formed by solutions of sedimentation or adulteration.

The first fixed electrodes 14 are like parallel spaced apart fingers and extend outwardly from four outer sides of the first fixed element 13 in directions of the X-axis and Y-axis, respectively.

The first moveable electrodes 16 are like parallel spaced apart fingers and arranged to extend inwardly, from four inner sides of the second moveable mass 15 toward four outer sides of the first fixed element 13.

Figure 4:
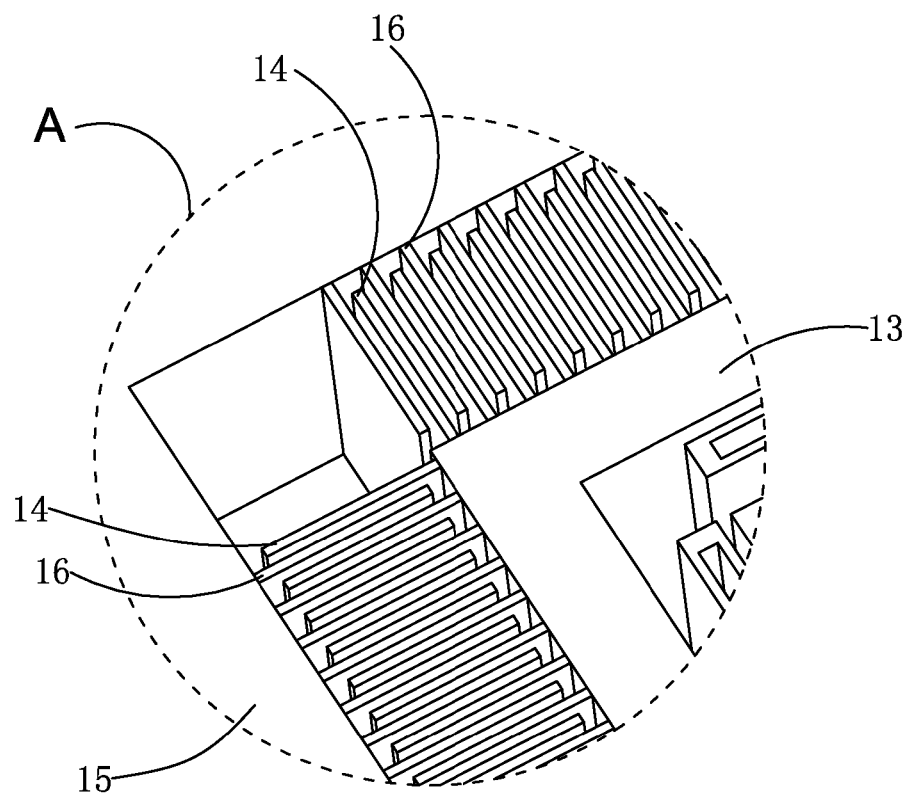
FIG. 4 depicts an enlarged view of area A in FIG. 1.

Referring to FIG. 4, the first fixed electrodes 14 and the first moveable electrodes 16 are interdigitated like fingers and parallel spaced each other so that each first fixed electrode 14 is parallel to its adjacent first moveable electrode 16.

Accordingly, variable capacitances are formed between the first movable electrodes 16 and the corresponding adjacent first fixed electrodes 14. When, the second moveable mass 15 is driven by an acceleration and move along directions of X-axis and Y-axis, differential capacitances are generated between the first movable electrodes 16 and the corresponding adjacent first fixed electrodes 14. The variations in differential capacitance are measured by processing circuitry which converts the differential capacitances into signals corresponding to the acceleration of the second moveable mass 15. So, the second moveable mass 15 is used for sensing the acceleration in X-axis and Y-axis.

And, a plated capacitance is formed between the first moveable mass 11 and the second fixed electrode 21. When the first moveable mass is driven by an acceleration and move in a direction of Z-axis, the plate capacitance in Z-axis generate a variation. Thereby, the variation of the plated capacitance in Z-axis is measured so that the first moveable mass can sense the acceleration of the first moveable mass 11 in Z-axis.

In the exemplary embodiment, all elements of the accelerometer are integrated on the only one substrate. So, the accelerometer can get smaller size, lower cost, improved performance, and it is easy to manufacture.

While the present invention has been described with reference to a specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. An accelerometer comprising:
a substrate define a stationary electrode thereon,
a first moveable mass defining a conductive-layer thereon facing the stationary electrode;
a plurality of first elastic elements coupled with a peripheral side of the first moveable mass;
a first fixed element surrounding the first moveable mass, coupled with the first elastic elements and fixedly attached to the substrate;
a plurality of first fixed electrodes extending outwardly from the first fixed element;
a second moveable mass surrounding the first fixed electrodes;
a plurality of first moveable electrodes extending inwardly from the second moveable mass toward the first fixed element and parallel to the first fixed electrodes, respectively;
a plurality of second elastic elements coupled with a peripheral side of the second moveable mass;
and a second fixed element surrounding the second moveable mass, coupled with the second elastic element and fixedly attached to the substrate.

2. The accelerometer as described in claim 1, wherein a plurality of holes is defined on the first moveable mass or the second moveable mass.

3. The accelerometer as described in claim 1, wherein outlines of the first moveable mass, the first fixed element, the second moveable mass and the second fixed element are configured as squares.

4. A tri-axis accelerometer, comprising:
a substrate supporting a first frame, and including a first conductive-layer thereon;
a first moveable mass connected to the first frame by a plurality of first elastic members and being capable of moving along both directions parallel to the substrate;
a plurality of first moveable electrodes extending from an inner side of the first moveable mass;
a second frame surrounded by the first moveable electrodes, the second frame defining a plurality of first fixed electrodes extending from an outer side of the second frame toward the first moveable mass;
each of the first fixed electrode being located between two adjacent first moveable electrodes, and each of the first moveable electrodes being located between two adjacent fixed electrodes;
a second moveable mass surrounded by the second frame and connected to the second frame by a plurality of second elastic members, the second moveable mass being capable of moving a direction perpendicular to the substrate, the second moveable mass defining a second conductive-layer facing the first conductive-layer on the substrate; wherein
the first fixed electrodes and the first moveable electrodes form a comb capacitor having variable capacitance according to variable overlapped area therebetween; and
the first conductive-layer and the second conductive-layer form a plate capacitor having variable capacitance according to variable distance therebetween.

* * * * *